United States Patent [19]
Berstis et al.

[11] Patent Number: 5,553,254
[45] Date of Patent: Sep. 3, 1996

[54] INSTRUCTION CACHE ACCESS AND PREFETCH PROCESS CONTROLLED BY A PREDICTED INSTRUCTION-PATH MECHANISM

[75] Inventors: Viktors Berstis, Croton-on-Hudson, N.Y.; Raymond J. Pedersen, Boca Raton, Fla.

[73] Assignee: International Business Machines Corporation, Armonk, N.Y.

[21] Appl. No.: 359,718

[22] Filed: Dec. 20, 1994

Related U.S. Application Data

[63] Continuation of Ser. No. 4,814, Jan. 15, 1993, abandoned.

[51] Int. Cl.[6] .............................. G06F 9/38; G06F 12/08
[52] U.S. Cl. .......................... 395/375; 395/452; 395/464
[58] Field of Search ................................. 395/375, 425, 395/800, 452, 464

[56] References Cited

U.S. PATENT DOCUMENTS

| | | | |
|---|---|---|---|
| 4,435,756 | 3/1984 | Potash | 395/375 |
| 4,716,994 | 12/1987 | Oklobdzija et al. | 395/375 |
| 4,743,908 | 7/1990 | Emma et al. | 395/375 |
| 4,847,753 | 7/1989 | Matsuo et al. | 395/375 |
| 4,855,904 | 8/1989 | Daberkow et al. | 395/375 |
| 4,881,163 | 11/1989 | Thomas et al. | 395/250 |
| 5,226,130 | 7/1993 | Favor et al. | 395/375 |
| 5,230,068 | 6/1993 | Van Dyke et al. | 395/375 |
| 5,257,359 | 10/1993 | Blasco et al. | 395/425 |
| 5,287,487 | 2/1994 | Priem et al. | 395/425 |
| 5,317,701 | 5/1994 | Reininger et al. | 395/375 |
| 5,327,536 | 7/1994 | Suzuki | 395/375 |
| 5,442,756 | 8/1995 | Grochowski et al. | 395/375 |

OTHER PUBLICATIONS

Johnson, "Superscalar Microprocessor Design", Prentice--Hall 1991, pp. 71–76.

*Primary Examiner*—Krisna Lim
*Assistant Examiner*—Viet Vu
*Attorney, Agent, or Firm*—Lawrence D. Cutter

[57] ABSTRACT

A first-in-first-out queue is used to manage instruction sequence execution from an instruction cache in a computer processor. Fields are provided in the queue element structure for not only referencing the correct instruction cache line but also for specifying cache line subsequences and the location of branch instructions so as to cause subsequent execution from other cache lines. The structure is particularly supportive of instruction loops and provides significant performance improvement through the elimination of unnecessary cache line writeovers.

8 Claims, 5 Drawing Sheets

INSTRUCTION CACHE ACCESS AND PREFETCH PROCESS CONTROLLED BY A PREDICTED INSTRUCTION-PATH MECHANISM

RELATED APPLICATION

This application is a continuation of application Ser. No. 08/004,814, filed Jan. 15, 1993 now abandoned.

BACKGROUND OF THE INVENTION

The present invention is generally directed to computer systems. More particularly, the present invention is directed to an apparatus and a method for controlling the execution of machine instructions in a digital computer. Even more particularly, the present invention provides a mechanism for managing an instruction cache in a more efficient manner through the utilization of a queue structure resulting in fewer situations in which data is prematurely or unnecessarily removed from an instruction cache.

One of the major design goals in the construction of computer systems is the increase in computer speed. In order to achieve these speed objectives, several mechanisms have been introduced. In particular, computer system designers have employed cache memory structures which are relatively small but which are also relatively fast and which act, in essence, as a buffer between a main memory storage level and the storage level associated with machine registers. In order to take advantage of the speed characteristics of a cache memory, portions of the main memory are transferred to the cache memory from which they are executed. Since access to the cache is relatively rapid, the overall speed of the system is effectively increased. Additionally, while certain instructions are being executed out of one portion of cache memory it is possible to load other instructions into different portions of the cache memory which is usually organized into substructures referred to as "cache lines". However, it is nonetheless necessary to provide some mechanism for mapping main memory addresses into cache addresses. Accordingly, for this purpose, an N-entry directory is typically provided so as to allow reference to any one of N cache lines.

In addition to the utilization of cache memory structures for computer speed enhancement, it is also desirable to employ mechanisms for the recognition and prediction of computer instruction branching events. Known branch prediction mechanisms provide branch prediction and address information which in turn is used to determine the appropriate instruction sequence which is to be executed from a cache memory. In the present invention, branch prediction and branch history mechanisms play only an indirect role in the management of the cache structure in the present invention.

One of the trade-offs in the design of cache memory structures is that they are relatively small compared to main memory structures. Nonetheless, this size relationship provides a mechanism for increased cache speed. Accordingly, it is very desirable to provide a mechanism for loading a fixed number, K, of future instruction cache lines into a cache memory. These cache line entries are loaded well ahead of the times when they will be accessed and processed. However, the number of cache lines which can be preloaded is limited by the fact that there is a danger that one would overwrite a previously fetched cache line that either had not yet been processed or which might need to be reprocessed due to the presence of instruction loop conditions. The natural solution to this problem is the employment of larger cache structures. However, as the instruction cache size grows in terms of the number of cache lines, there is a concomitant and corresponding decline in cache speed. Accordingly, it is desirable to provide a mechanism for managing access to instructions within the instruction cache so as to reduce those instances in which a prefetched cache line is prematurely discarded.

In an ideal situation, when as many instructions as possible are being executed by the computing system from instruction sequences contained in the instruction cache itself, minimal reference is made to the slower main memory structure from which cache lines are replaced. Accordingly, it is seen that mechanisms for which cache lines are prematurely replaced experience speed penalties as a result. In particular, the use of an N-entry directory as a mechanism for associating a given instruction address to a particular cache line using a hashing or mapping function can in fact result in situations where subsequent cache lines overwrite previously fetched cache lines that had either not yet been processed or might need to be reprocessed. Accordingly, it is desirable to be able to provide a different and improved management system for instruction cache structures in digital computer systems.

SUMMARY OF THE INVENTION

In accordance with a preferred embodiment of the present invention, a management mechanism for providing instructions for execution within a digital computer comprises a first-in-first-out (FIFO) queue such as might be defined by a plurality of elements in a small memory array. Additionally, there is provided pointer means for indicating a current one of the elements in the queue. An instruction cache which is managed by the queue stores a plurality of individually addressable instruction sequences. Also provided is a means for selecting one of the instruction sequences and a point within the selected sequence for initiating instruction execution in response to the contents of the currently indicated FIFO queue element.

While the above-identified structure provides the essential mechanism for carrying out the instruction cache management method of the present invention, there are other important aspects and features that are present in preferred methods and circuits for carrying out the present invention. In particular, means are also provided to indicate a last element in the FIFO queue in accordance with the mechanism for implementing the FIFO queue as a memory array. Additionally, elements in the FIFO queue preferably include not only a pointer to an appropriate cache line, as described above, but also provide a pointer to a beginning target offset within this cache line and to a branch offset and a one bit field to indicate that the branch offset field is enabled or desired.

In the present invention, the FIFO queue typically contains J entries. This queue stores future cache line data sequentially by order of expected execution, indicating both branch targets into the lines and branches out of the cache lines. This alleviates the danger of hash function collision, called addressing collision, which could otherwise prematurely overwrite prefetched data. Additionally, this structure and mechanism simplifies the retrieval of instruction data for the instruction parser. Thus the invention keeps track of predicted instruction paths through a series of disjoint cache lines. This provides a much more seamless stream of instructions to the instruction parser resulting in fewer delay situations.

Accordingly, it is an object of the present invention to manage an instruction cache in a computer system in a fashion such that fewer rewrites to instruction cache lines are required, especially when the rewrite is premature and overlays sequences for soon to be executed instructions.

It is also an object of the present invention to enhance overall machine execution speed especially through the elimination of unnecessary delays caused by rewriting cache lines.

It is yet another object of the present invention to render the execution of certain sets of loop instructions executable in a fewer number of machine cycles.

It is an even further object of the present invention to employ branch prediction information in the determination of which instruction sequence is executed from an instruction cache and to determine what memory data needs to be written into cache lines well ahead of when they are used.

Lastly, but not limited hereto, it is an object of the present invention to employ a queue structure for the control of instruction sequences which are to be executed from a plurality of cache lines in an instruction cache portion of a digital computer processing system.

DESCRIPTION OF FIGURES

The subject matter which is regarded as the invention is particularly pointed out and distinctly claimed in the concluding portion of the specification. The invention, however, both as to organization and method of practice, together with further objects and advantages thereof, may best be understood by reference the following description taken in connection with the accompanying drawings in which:

DETAILED DESCRIPTION OF THE INVENTION

Figure 1:
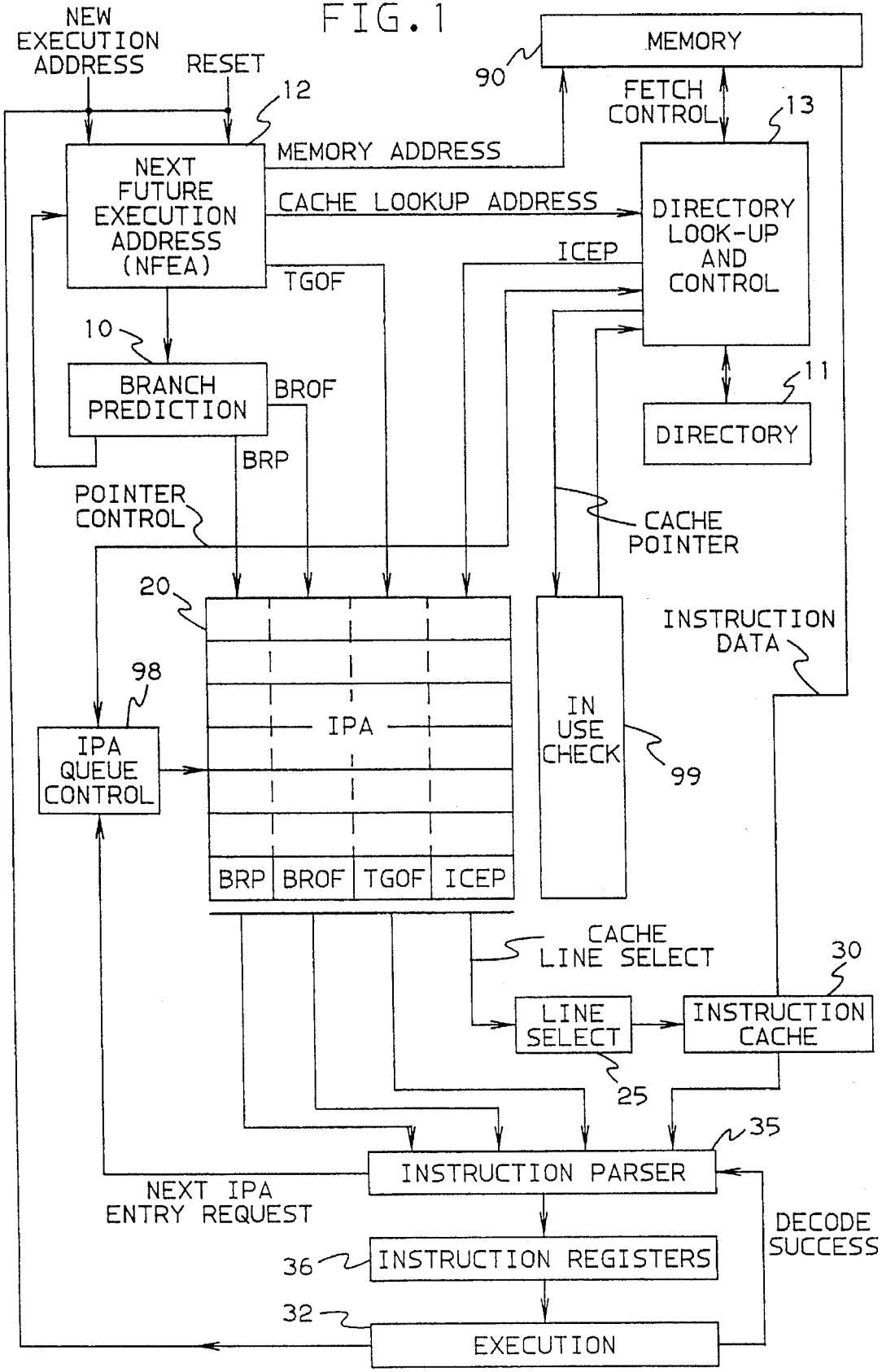
FIG. 1 is a block diagram illustrating the overall environment in which the present invention is employed.

FIG. 1 illustrates in block diagram form the overall environment in which the present invention is employed. In particular, it is noted that the invention is employed to control the sequencing of instructions from instruction cache 30 to that portion of the computer system which performs instruction execution.

In particular, branch prediction mechanism 10 is employed in conjunction with an instruction cache (I-CACHE) directory 11 to determine in accordance with directory lookup function circuit 13 when it is desirable to prefetch an instruction. Through the FETCH CONTROL line directory lookup circuit 13 issues a fetch command to memory 90 and also provides a tag to indicate where data is to go in cache 30. Relevant information concerning this prefetch instruction is also stored in instruction path array (IPA) 20 which is configured as a queue and which is described more particularly below. Additionally, branch prediction circuit 10 is employed in conjunction with new instruction address information from register 12 to generate a branch target address based on new address information at the previously predicted branch target. (The particular method or algorithm for predicting branches does not form part of this invention. However, it is noted that this field of endeavor is replete with various methods including those methods relying on branch history tables.) The branch target information is used in conjunction with entries in instruction cache directory 11 and current field pointers in instruction path array 20 to determine whether or not the selection of a particular instruction cache line is indicated. This is carried out in cache line select circuit 25 at the request of instruction parser 35 through IPA queue control 98. Target offset (TGOF) and branch offset (BROF) fields in instruction path array 20 control instruction parser 35 to ensure that the appropriate set of indicated instructions is provided to instruction registers 36 and thus to the execution portion of the machine. (See the discussion below with respect to BRP Field 28.) Thus instruction parser 35 assembles cache line data in sequential order for instruction parsing. From a certain viewpoint then, the upper-left-hand portion of FIG. 1 is more concerned with setting up instruction prefetch operations whereas the lower-right-hand portion of FIG. 1 is more concerned with the actual selection of prefetched instructions from instruction cache 30. And, in fact, these two portions operate independently interlocking only on the instruction path array mechanism 20 under full or empty conditions. It is thus through the control of instruction path array mechanism 20 that the sequence of instructions which is to be executed is determined.

Figure 2:
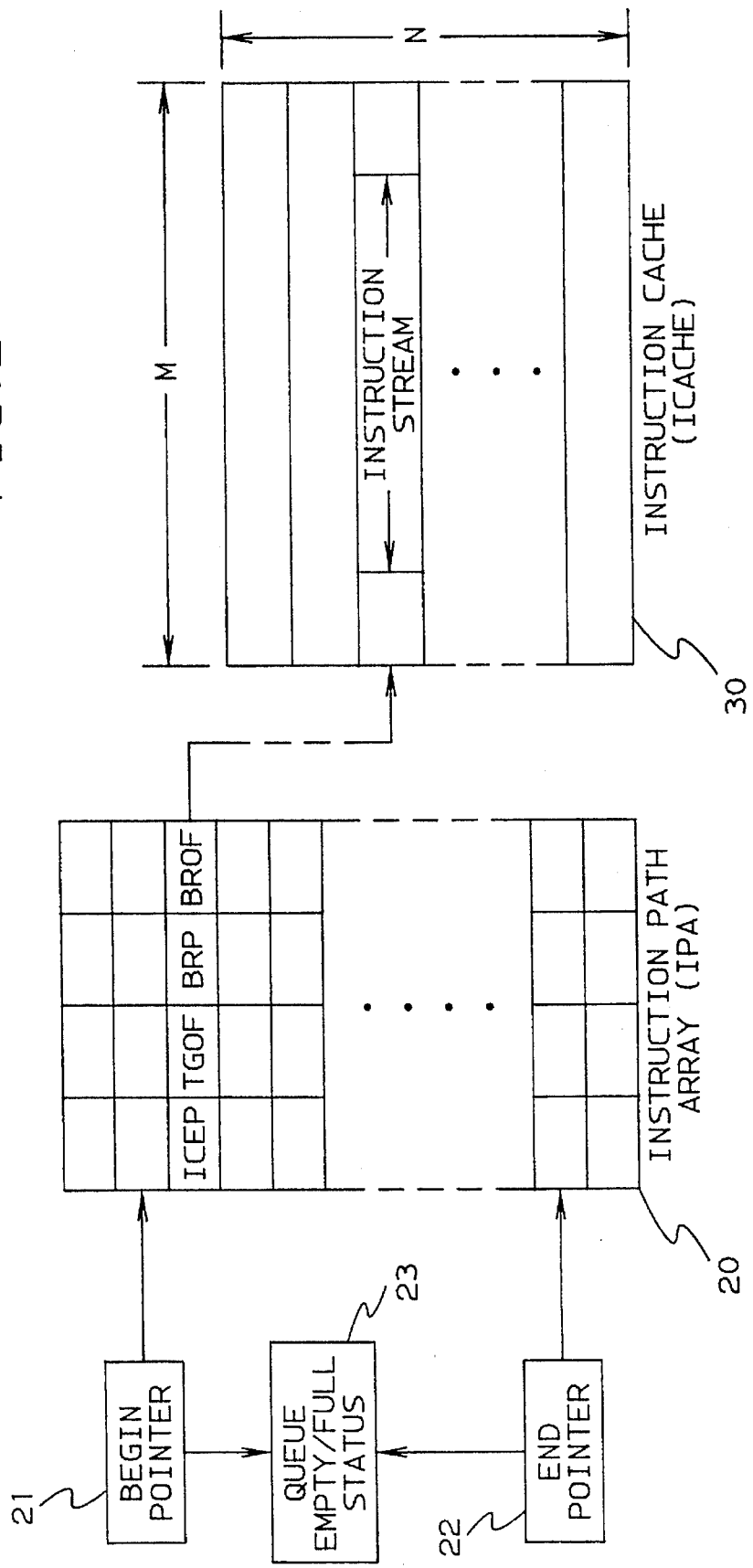
FIG. 2 is a block diagram particularly illustrating the relationship between the elements of the present invention.
Figure 3:
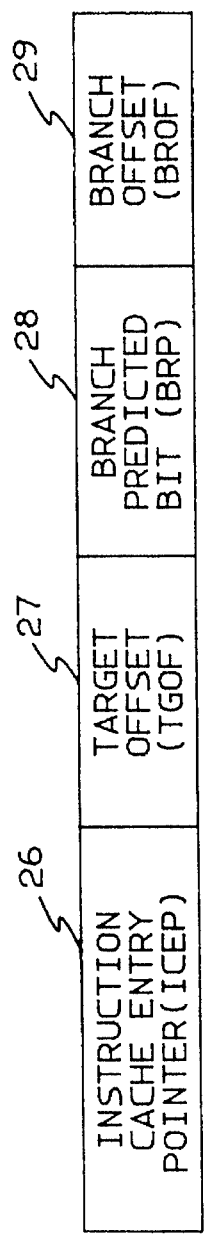
FIG. 3 is a block diagram illustrating the fields contained within the instruction path array queue element.

A somewhat more detailed description of a portion of FIG. 1 is shown in FIG. 2. The essential operation of the present invention is rooted in the presence of instruction path array 20 and its interaction with instruction cache (ICACHE) 30. In particular, it is seen that instruction path array 20 contains a plurality J (see FIG. 3) of individual field pointers. Each element in array 20 (which is controlled to operate as a first-in-first-out queue), operates in several ways to control the selection of instructions from ICACHE 30. In particular, IPA 20 includes four fields including instruction cache entry pointer 26 (ICEP—see FIGS. 2 and 4), target offset field 27 (TGOF—also see FIGS. 2 and 4). Also included among the fields in IPA 20 are the branch predicted bit (BRP) 28 and branch offset field (BROF) 29 which are employed to provide a mechanism for terminating instruction stream or substream processing as indicated by entries in instruction cache 30. As shown in FIG. 2, instruction cache 30 typically comprises a plurality, N, of instruction cache lines. Each of these cache lines contains M bytes (or other units of information) of instruction information. Also illustrated in FIG. 2 is the fact that entries in instruction path array 20 are employable to select subportions of an instruction cache line for execution. The way in which instruction path array fields 26 through 29 (see FIG. 3) are employed for the management of instruction stream execution is more particularly described below. Additionally, there is also described below a method which is preferably employed for determining the information stored in instruction path array 20.

Figure 4:
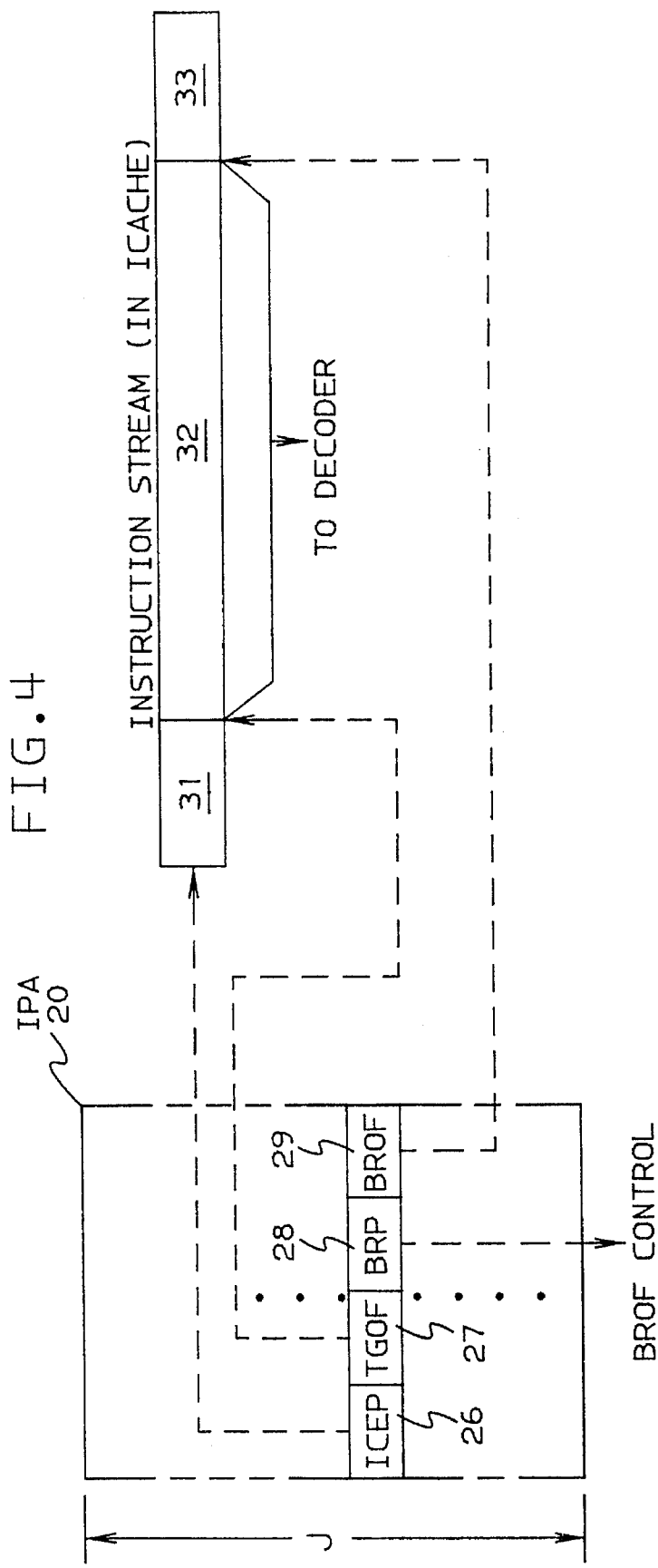
FIG. 4 is a block diagram illustrating the relationship between the fields contained in the instruction path array and corresponding elements from the instruction stream contained in the instruction cache.

The instruction path array preferably operates as a first-in-first-out (FIFO) queue with J entries (see FIG. 4 for an illustration of J being used as a designator for the number of entries). The queue's first and last entries are identified by "BEGIN" and "END" pointers (21 and 22 in FIG. 2). These pointers preferably comprise two small latch registers pointing to specific memory locations in a memory array (here the IPA).

The instruction path array queue contains information which describes the predicted sequence of instructions that are decoded and executed by the processor as the result of branch prediction mechanism 10. The next future execution address (NFEA; see register 12 in FIG. 1) contains the instruction address for a future point in instruction execution, that is, the point for which new instruction path array information is built and for which an instruction cache line is fetched (if not already present in the instruction cache).

In the present invention, each instruction path array entry preferably consists of the following four fields: instruction cache entry pointer 26 (ICEP), target offset 27 (TGOF), branch predicted bit 28 (BRP) and the branch offset 29 (BROF). Instruction cache entry pointer 26 (ICEP) associates the queue entry with one of the N lines in instruction cache 30. It is noted that more than one instruction path array queue entry may reference the same instruction cache line. For example, this is often a convenient structure in the case of instruction loops. The target offset field (TGOF) 27 indicates the offset within the cache line referenced by ICEP field 26 at which the first instruction to be decoded and executed appears. TGOF field 27 indicates the target of a prior branch or is set to zero to indicate sequential execution from the prior instruction cache line. This mechanism provides considerable flexibility in structuring a sequence of instructions which are to be executed by the machine from an instruction cache.

Branch predicted field (BRP) 28 indicates whether the last half word of a branch instruction appears in the referenced instruction cache line when the branch prediction mechanism predicts that the branch is to be taken. (It is noted though that whether it is the last half word, whole word or other functioned word length is indicated or not may depend on the instruction architecture and format of the specific machine employing the invention.) Branch offset field (BROF) 29 provides an offset indicator to the last half word of the predicted branch instruction in the reference instruction cache line. This branch offset is relevant when the BRP field is "1" indicating that a branch is to be taken. The relation between the individual fields in instruction path array 20 is more particularly illustrated in FIG. 4. Note that the value placed in the branch offset field 28 points to the last half word of an instruction to ensure that the entire instruction is passed along to execution units contained within the machine. Instruction parser 36 uses the TGOF 27 and BROF 29 fields to extract the required instruction data 32 from the cache line and to discard portions 31 and 33 of the cache line which are not to be parsed and executed.

The invention operates in the following fashion which is more particularly illustrated in FIG. 5. In the discussion below, it is important to keep in mind that at the same time that instructions are being supplied from the instruction cache to the execution unit of a machine, a separate process is occurring relative to the information which is being placed in instruction path array 20. For purposes of understanding the operation of the present invention, it is therefore important to understand that the description immediately following relates to the process for controlling and establishing the contents of the instruction path array which is in itself used to control instruction stream information passing to the execution unit.

Figure 5:
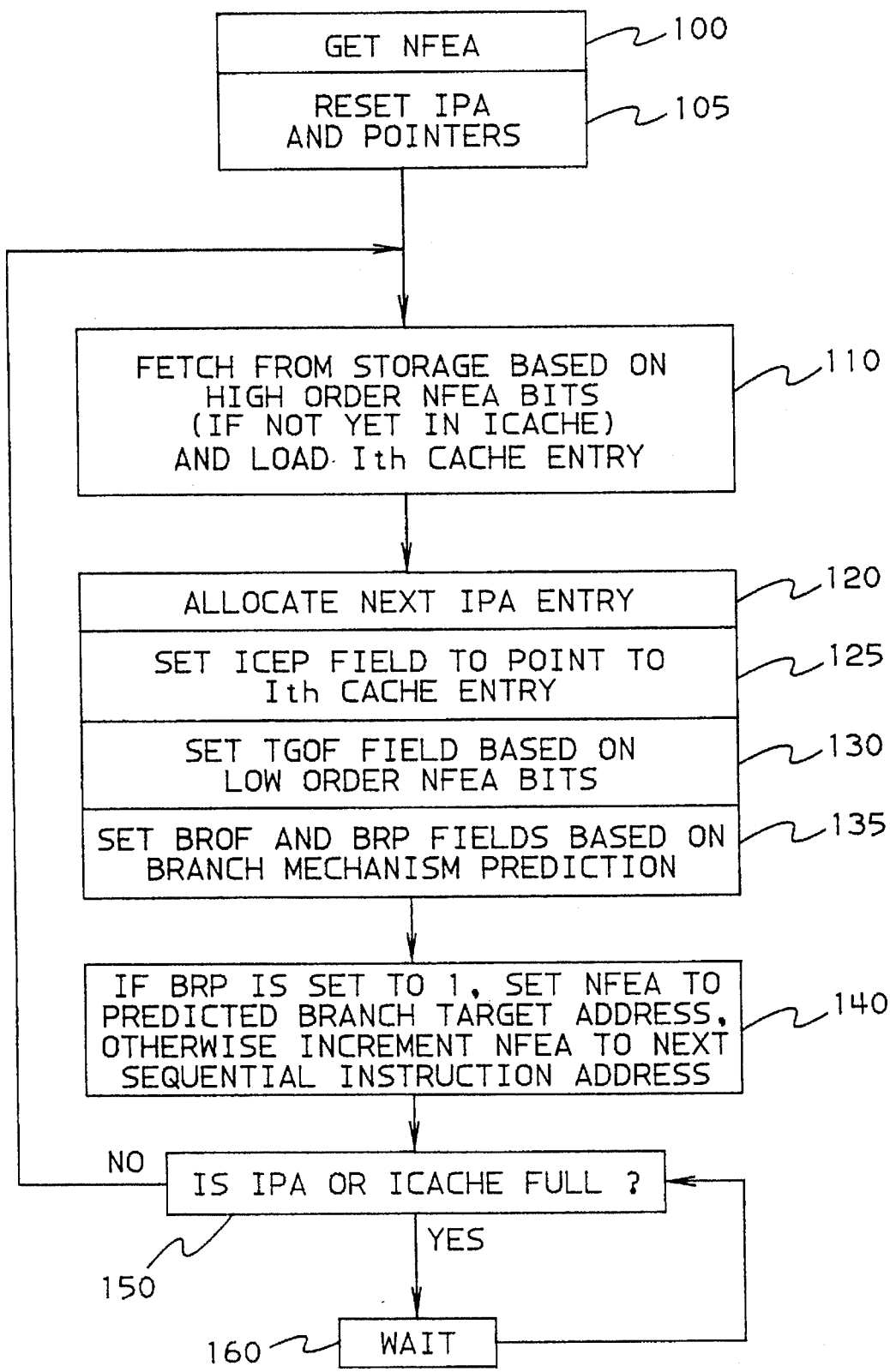
FIG. 5 is a flow diagram illustrating one portion of the operation preferably carried out in the present invention which is concerned with setting up instructions for later processing from a cache.

Under initial conditions, an execution address for starting execution and the next future execution address (NFEA) are set (FIG. 5, step 100). Additionally, the instruction path array queue is reset to the empty state (step 105). This is readily carried out by forcing pointers 21 and 22 (FIG. 2) to point to adjacent locations in instruction path array 20 (IPA). Likewise, a determination of whether or not the IPA is full is readily determined by a pointer comparison to determine whether or not these pointers are set to the same IPA location or entry point. It is likewise possible to provide an indication that IPA 20 is full by comparing beginning and end pointers, 21 and 22, respectfully to determine that the next referenced location (as provided by circuit 23 in FIG. 2) is the one immediately after the beginning pointer reference. An additional one bit register is also preferably employed to distinguish between full and empty conditions as preferably provided in IPA queue control 98. Otherwise, IPA 20 is only partially full.

A fetch from a main storage mechanism (typically referred to as a level 2 or 3 storage device) is initiated unless the referenced data is already in instruction cache 30. This is determined by directory lookup function 13 in FIG. 1. The fetch from main storage retrieves the instruction line identified by the high order bits of the next future execution address and is placed in the $I^{th}$ entry of the instruction cache (ICACHE 30) but with the assurance that no current ICEP entry is equal to I using the IPA-IN-USE-CHECK logic 99 (in FIG. 1). The IN-USE-CHECK determines if a given cache line is referenced by any valid ICEP 26 pointer, which is used to indicate that the cache line in question should not be overwritten with new data. Then the next instruction path array entry is allocated (step 120). This entry's ICEP field is set to I corresponding to the instruction cache line which contains the data identified by the next future execution address (NFEA). The low order bits of the NFEA are used to set the instruction path array target offset field (TGOF 27) which indicates the starting execution offset for that instruction cache line (step 130). Then branch prediction circuit 10 is used to determine if there is a branch taken whose last half word appears at or after the target offset instruction in the cache instruction line which is to be fetched for the $I^{th}$ cache entry (step 135). If a branch is not predicted, then the instruction path array BRP bit 28 is set to zero and the next future execution address is incremented to the next sequential address and corresponding cache line (step 135). If a branch is predicted, then the instruction path array BRP bit is set to "1" and instruction path array branch offset field (BROF 29) is set to the offset of the last half word of the branch taken in the cache line (step 140). If instruction path array 20 is full or if instruction cache 30 is full, a wait condition is entered until processing can be resumed when either the instruction path or instruction cache are no longer full. In such an event, the process continues as above with a possible fetch from main storage, this fetch being based upon the high order NFEA bits.

Figure 6:
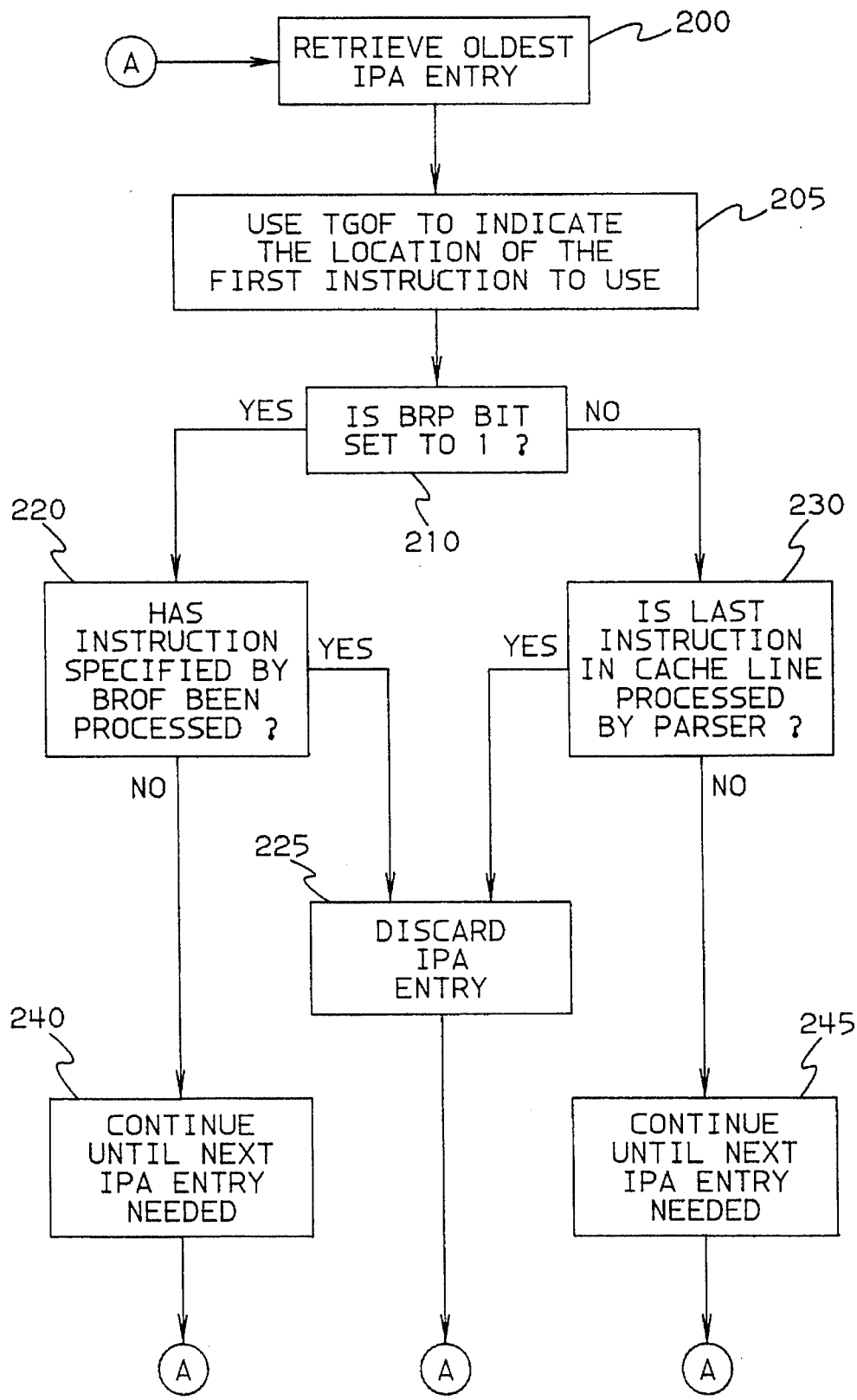
FIG. 6 is a flow diagram illustrating the portion of the present invention carried out in selecting and executing instructions.

During the activity which is described above and which is illustrated in FIG. 5, execution in the processor occurs as is shown in FIG. 6. The oldest instruction path array entry is retrieved (step 200). The instruction to be parsed next is found at the offset indicated by instruction path array TGOF field 27 in the cache line identified by corresponding instruction path array ICEP field 26 (step 205). When the instruction path array BRP bit is set to one and after the instruction at the offset BROF field has been parsed (steps 210 and 220) or when the instruction path array BRP bit is off and after the last instruction and data in the line has been consumed by the instruction parser mechanism (steps 210 and 230), then the instruction path array entry is discarded (step 225) and the method proceeds as above with the retrieval of the next oldest instruction path array entry. Instruction parsing continues for this instruction cache line until the above condition requires (steps 240 and 245) a return to the earlier step of instruction path array entry retrieval. During this activity, instruction cache lines which are available for reclamation or rewrite are those which have no instruction path array entry which refers to them via ICEP pointer field 26. It is noted that this activity is in addition to any other replacement method which may also be in effect, such as least recently used (LRU) algorithms. This permits instructions for data loops to be retained in instruction cache 30.

From the above, it should be appreciated that the method and apparatus of the present invention provides a system which fulfills all of the objectives stated herein above. In particular, it is seen that the method and apparatus provided improve system performance by preventing unnecessary and premature rewrite of instruction cache lines. This result is at least partially achieved by the greater flexibility and control over instruction flow provided by the instruction path array queue method. Additionally, it is seen that the use of a queue for managing instruction sequencing from a cache structure provides advantages in terms of being able to structure loops and to more particularly tailor and control not only whole cache lines but subportions thereof. Such structures and methods exhibit significantly improved system performance advantages with minimal cost in terms of the circuitry employed.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. An apparatus for controlling execution sequencing of computer instructions stored within a cache memory, said apparatus comprising:

an instruction cache memory storing a plurality of individually addressable cache lines for a plurality of instruction sequences;

a first-in-first-out memory array queue storing a plurality of queue elements for controlling the operations of said instruction cache memory;

pointer means for providing an indication of a current one of the elements in said queue;

means for selecting a current one of the elements in said memory array queue;

said selected one of the elements in said memory array queue containing a plurality of fields for controlling the operation of said instruction cache memory;

a first one of said fields identifying an entry point which indicates one of said cache lines in said instruction cache memory for one of said instruction sequences; and a second one of said fields in said memory array queue identifying an address of an instruction contained within said selected instruction sequence for selecting the first instruction of said selected instruction sequence which is to be decoded and executed.

2. The apparatus of claim 1 in which a third one of said fields indicates whether or not said first instruction is a branch instruction.

3. The apparatus of claim 1 in which a fourth one of said fields indicates the end portion of said branch instruction when said third field indicates the presence of a branch instruction within the selected instruction sequence.

4. The method for controlling execution sequencing of computer instructions stored within a cache memory comprising the steps of:

prefetching instruction data for storage in cache lines of an instruction cache memory;

assembling queue information elements which reference said cache line for controlling the operation of said instruction cache memory, said information elements being stored in a first-in-first-out memory array queue; and causing an instruction sequence made up of at least a portion of said individual cache lines to be transferred from a designated cache line of said instruction cache memory to the execution portion of a computer processor, said transfer to said execution portion being directly controlled by a selected queue element of said memory array queue which specifies an instruction cache entry point.

5. The method of claim 4 in which said selected queue element also designates locations within the designated cache line of said instruction cache memory.

6. The method of claim 5 in which a first one of said locations indicates whether or not a branch instruction is within said instruction sequence.

7. The method of claim 6 in which a second one of said locations indicates the beginning portion of a branch instruction when said first location indicates the presence of a branch instruction is within said instruction sequence.

8. The method of claim 7 in which a third one of said locations indicates the end portion of said branch instruction.

* * * * *

UNITED STATES PATENT AND TRADEMARK OFFICE
CERTIFICATE OF CORRECTION

PATENT NO. : 5,553,254
DATED : Sep. 3, 1996
INVENTOR(S): Viktors Berstis et al.

It is certified that error appears in the above-identified patent and that said Letters Patent are hereby corrected as shown below:

Col. 8, line 14  "claim 1" should be --claim 2--.

Signed and Sealed this

Twenty-fifth Day of March, 1997

*Attest:*

BRUCE LEHMAN

*Attesting Officer*  *Commissioner of Patents and Trademarks*